Patented Feb. 21, 1939

2,148,285

UNITED STATES PATENT OFFICE 2,148,285

SHAVING CREAM

Stamford White, Greenwich, Conn.

No Drawing. Application May 17, 1935, Serial No. 21,974. Renewed July 26, 1938

1 Claim. (Cl. 167—85)

This invention relates to shaving cream and particularly to one which will soften the beard so that it can be readily cut by the razor and which at the same time imparts to the skin a certain smoothness and slipperiness which minimizes the danger of cutting the skin.

The composition according to my invention is antiseptic and has the characteristics of a vanishing cream thereby avoiding the necessity of washing after shaving and at the same time produces none of the harmful effects on the skin such as smarting and burning.

Other objects and advantages of my invention will appear from the following description:

Specifically my invention comprises a cream having a stearic acid or equivalent as a base, tragacanth gum, green soap, boric acid, glycerine and a relatively large quantity of water. The water is largely absorbed by the tragacanth gum and imparts to the cream a smooth, jelly-like consistency.

Specific examples of such compositions are as follows:

| | Parts by weight |
|---|---|
| Stearic acid | 50 |
| Lanolin | 9 |
| Triethanolamine | 3 |
| Borax | 1.7 |
| Water | 160 to 212 |
| White mineral oil | 9 |
| Alcohol | 7 |
| Perfume in alcohol (Such as .5 menthol, .5 oil of lavender) | 1 |
| Tragacanth gum | 2.5 to 3.75 |
| Green soap | 6 |
| Boracic acid | 1 |
| Glycerine | 6 |

When I employ 2.5 parts of tragacanth gum, I preferably use approximately 160 parts of water and with 3.75 parts of gum I use approximately 212 parts of water.

I find that the tragacanth gum in the composition is very advantageous. Not only does it impart to the composition a jelly-like consistency but with the other ingredients forms a light protecting coating over the skin. Also in the combination it is slippery and for this reason protects the skin from cutting without detracting from the ease with which the hair is cut. Also it has healing properties and is an absorbent for the oils of the skin.

In place of the tragacanth gum, I may use an equivalent thereof, such as Tragasol, a material made from the locust bean.

The green soap adds to the slippery character of the composition and in combination with the lanolin greatly assists in the penetration and softening of the hair. Furthermore, being neither alkaline nor acid it does not affect the slightly acid antiseptic characteristic of the composition.

The boracic acid is antiseptic. Also it being acid, the boracic acid may be used with the stearic acid without alteration of the acid condition and furthermore the boracic acid acts as a preservative for the tragacanth which would otherwise deteriorate. The glycerine adds somewhat to the slippery character of the composition and to the hair penetrating and softening effects.

One method of preparing the above-mentioned composition is as follows:

The stearic acid and white mineral oil are heated together to the melting point of the acid; then the lanolin is added which will melt into the mixture. In another receptacle is placed about two thirds of the water, the borax and the triethanolamine which are heated to boiling and when the stearic acid mixture reaches 170° F. the acid solution is poured into the mixture of borax, triethanolamine and water and agitated vigorously. The boric acid is dissolved in part of the remaining water and the glycerine added and this mixture poured into the solution previously prepared. The green soap is dissolved in all of the water that remains and added to the mixture, stirring constantly. The temperature during this period should be approximately 150° F. To the tragacanth gum powder, the alcohol is added agitating vigorously. The addition of the alcohol to the tragacanth gum causes it to swell slightly and to prevent separation of the gum and alcohol this mixture should be agitated. While stirring the last named mixture and also the mass which has been prepared as described above, the tragacanth and alcohol mixture is slowly poured into the mass. After cooling to below the decomposition point of perfume, perfume in alcohol is added.

As a modification of this method of preparation, the shaving cream may be prepared as above described except for the addition of boric acid, glycerine and tragacanth which is added to the otherwise complete cream except for perfume. In this modification, part of the water that goes into the cream has been put to one side. The boric acid is dissolved in the water, the glycerine added and stirred, the tragacanth powder and approximately six ounces of alcohol is then added to the boric, glycerine and water solution and stirred vigorously. The resulting mass is in the form of a jelly and is then thoroughly mixed with the cream previously prepared.

When the mass is sufficiently cooled perfume is added.

The cream after being prepared should be left several days before using.

Before or after applying the cream it is well to wet the skin with water.

Having now described my invention what I claim and desire to secure by Letters Patent is:—

A jelly-like cream formed by mixing stearic acid 50 parts, triethanolamine 3 parts, lanolin 9 parts, water 160 to 212 parts, tragacanth gum 2.5 parts to 3.75 parts boracic acid 1 part.

STAMFORD WHITE.